United States Patent [19]

Houghton

[11] Patent Number: 4,727,825
[45] Date of Patent: Mar. 1, 1988

[54] PRIMATE EDUCATION DEVICE

[76] Inventor: Paul Houghton, 16230 Skyline Blvd., Woodside, Calif. 94062

[21] Appl. No.: 878,999

[22] Filed: Jun. 26, 1986

[51] Int. Cl.⁴ ................................................ A63F 9/06
[52] U.S. Cl. .................................... 119/29; 273/153 R
[58] Field of Search ............................ 119/29, 17, 19; 273/1 GA, 153 R, 153 S

[56] References Cited

U.S. PATENT DOCUMENTS

| | | | |
|---|---|---|---|
| 2,011,266 | 8/1935 | Boynton | 273/153 R |
| 2,525,738 | 10/1950 | Tormey | 273/153 R X |
| 2,796,044 | 6/1957 | Breland | 119/29 |
| 3,516,389 | 6/1970 | Meyer | 119/29 X |
| 3,857,364 | 12/1974 | Miller, Jr. | 119/29 X |
| 4,008,895 | 2/1977 | Keiner et al. | 273/153 R X |
| 4,513,971 | 4/1985 | Baldwin | 273/1 GA X |

*Primary Examiner*—William F. Pate, III
*Assistant Examiner*—Creighton Smith
*Attorney, Agent, or Firm*—Ciotti & Murashige, Irell & Manella

[57] ABSTRACT

An educational device for enriching the environment of a contained primate, including a variable and programmable maze as well as a mechanism whereby the primate may be instructed as to the location of the correct pathway through the maze.

9 Claims, 5 Drawing Figures

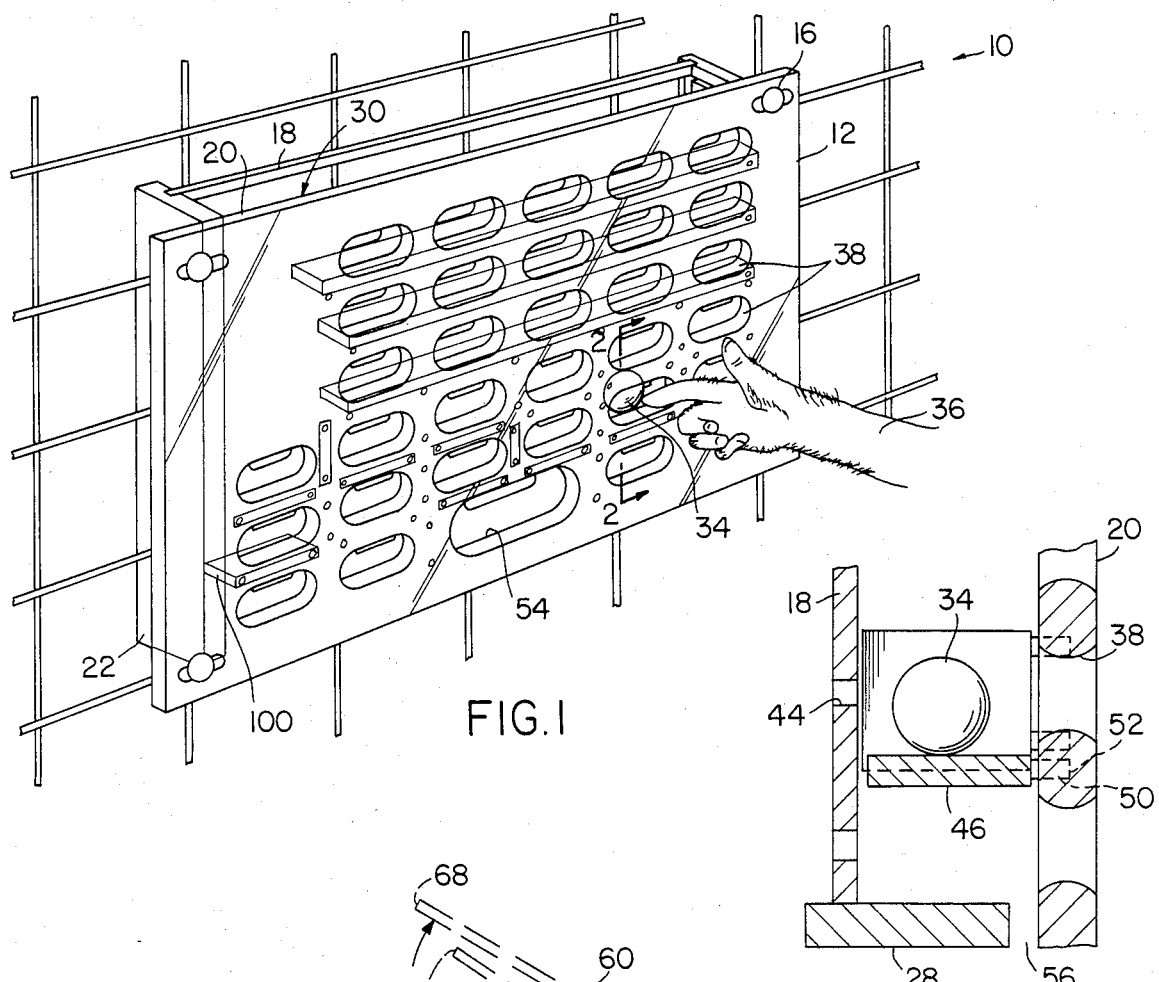
FIG. 1
FIG. 2
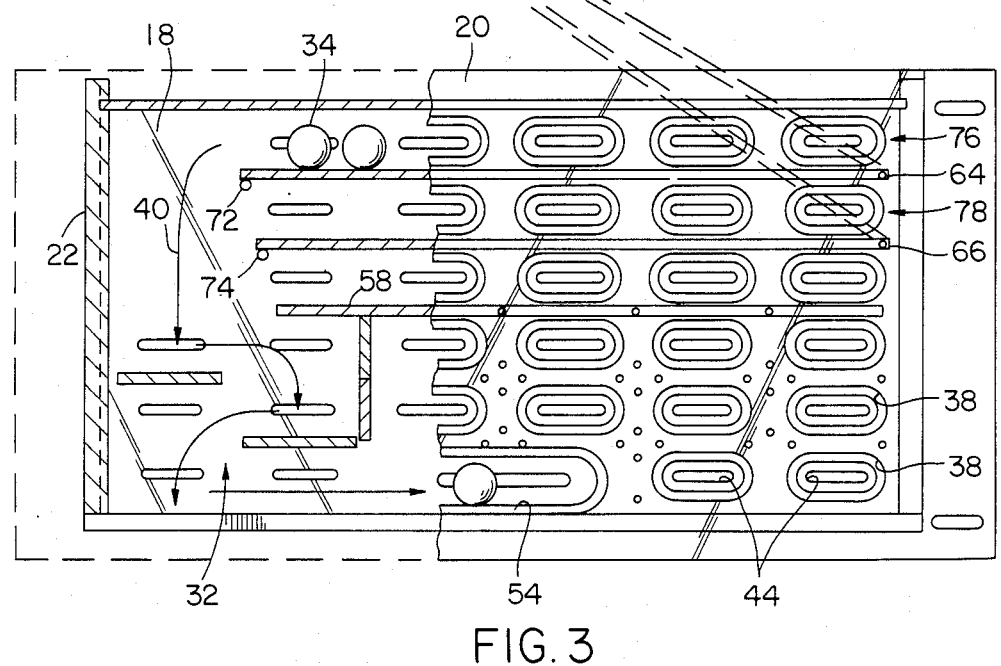
FIG. 3

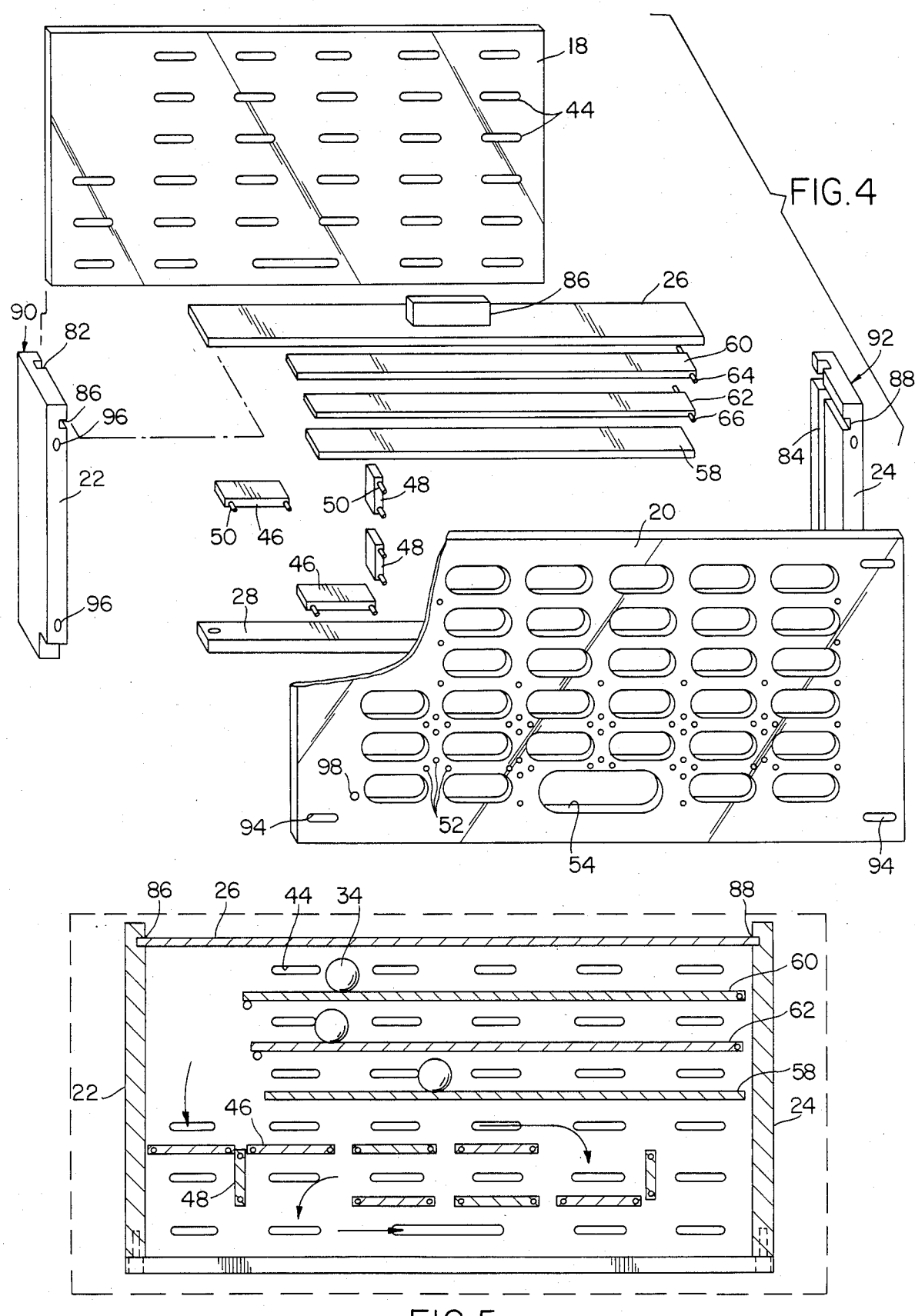

4,727,825

PRIMATE EDUCATION DEVICE

FIELD OF THE INVENTION

This invention relates generally to primate education devices, and more particularly relates to a primate education device having a variable and programmable maze structure.

BACKGROUND OF THE INVENTION

Primate instructional devices are known in the art. These devices typically serve the dual purposes of both educating the primate and enriching the primate's environment. There is increasing awareness that captive primates in civilized environments require mental stimulation to maintain health, strength and well-being. In fact, government regulation now mandates such humane treatment of caged primates.

Several such devices are designed for a primate to guide an object through a maze, i.e. by simulating "foraging" for a morsel of food so that the primate may retrieve the food at the end of a maze. Normally, however, a primate can learn a maze structure fairly rapidly, and the simpler, fixed maze-type educational devices are thus quickly stripped of their utility. Another drawback of many of these devices is that with more difficult mazes, which a primate may not learn absent some degree of instruction, there is no way to actually "teach" the primate to maneuver an object through the maze.

Thus, there is a need in the art for a primate educational device which is provided with (1) a variable rather than a fixed maze structure, and (2) a means for instructing the primate through the maze. The primate educational device of the present invention is directed to each of these considerations.

SUMMARY OF THE INVENTION

Accordingly, it is an object of the present invention to provide an educational device for enriching the environment of a contained primate, which device includes a variable and programmable maze structure.

It is another object of the present invention to provide a primate educational device having a means for instructing a primate through the maze.

It is still another object of the present invention to provide such a device having varying and programmable degrees of difficulty.

It is a further object of the present invention to provide a primate educational device attachable to a fixture in a primate environment such as to the exterior or to the interior of a primate cage, the maze structure of the device being accessible from both inside and outside the cage.

It is still a further object of the present invention to provide a primate educational device having a plurality of movable connecting stops within a container means, the connecting stops providing a continuous and variable pathway within the device.

Additional objects, advantages and novel features of the invention will be set forth in part in the description which follows, and in part will become apparent to those skilled in the art on examination of the following, or may be learned by practice of the invention.

In one aspect of the present invention, a primate education device is provided which can be placed in a primate environment, alleviating boredom and encouraging interaction with and active participation in the primate's environment. The device is specifically directed toward enriching the environment of individually housed research primates, including a variety of apes and monkeys. In a preferred embodiment, the device comprises a container means attachable to a fixture of a primate environment, for example, to the grating of a primate cage, the container means including a variable, programmable maze structure accessible from both inside and outside the cage. In a preferred embodiment, the container means is provided with opposing panels having substantially oppositely disposed access ports, and further is provided with a plurality of movable connecting stops defining a variable and continuous pathway within the container means.

BRIEF DESCRIPTION OF THE DRAWINGS

FIG. 1 is a perspective view of the primate education device as seen from inside the primate's cage.

FIG. 2 is an enlarged, sectional view of the lower portion of the primate education device taken along the 2—2 lines of FIG. 1.

FIG. 3 is a partially sectional rear elevational view of the primate education device, and illustrates the upper ledges in pivoted position.

FIG. 4 is an exploded, frontal view of the primate education device.

FIG. 5 is a partially sectional front elevational view of the primate education device.

DETAILED DESCRIPTION OF THE INVENTION

In FIG. 1, the primate education device is illustrated generally at 10. Container means 12 is attachable to a fixture of a primate environment such as to either side of meshed cage wall 14 by means of fasteners 16. Rear panel 18 of the container means rests adjacent cage wall 14, and directly opposes front panel 20 to which it is connected by means of side connecting strips 22 and 24 and top and bottom 26 and 28, respectively (see FIG. 3).

The interior 30 of the container means is provided with a variable maze structure 32 manually programmable to varying degrees of difficulty as will be described. Food morsel 34 or other object such as a "token" to further reward may be manipulated by primate 36 through frontal access ports 38 along continuous pathway 40. The device incorporates a means for instructing the primate as to the location of pathway 40 by virtue of rear access ports 44 substantially directly opposing frontal access ports 38. Thus, a trainer outside the primate cage may manipulate food 34 along continuous pathway 40 through rear access ports 44 so that primate 36 may observe the location of that pathway.

Turning now to the remaining figures, movable connecting stops 46 (horizontal) and 48 (vertical) define continuous pathway 40. Because these stops are movable within the container means, a variety of continuous pathways—i.e., "maze" structures—may be created. As best seen in FIG. 2, each of movable stops 46 and 48 are provided with pegs 50 adapted to fit snugly within recesses 52 in front panel 20.

Frontal access ports 38 are smaller than food morsel 34, so that primate 36 may not remove the food without successfully "completing" the maze, i.e. moving the food through the maze to exit port 54, which is larger than food morsel 34. When the device is attached to a meshed wall, care should be taken that bars of the mesh do not block access to exit port 54. Rear access ports 44 are also smaller than food morsel 34, but are large enough to allow external maneuvering of the food within the maze with a rod or similar structure.

FIG. 2 also illustrates drainage port 56 located within bottom 28. Drainage port 56 allows for automatic drainage of any fluid which may accumulate within the device during cleaning.

FIG. 3 illustrates the mechanism by which food 34 is placed within container means 12 for manipulation through continuous pathway 40 by primate 36.

Upper and lower pivotable shelves 60 and 62 are affixed at one end to pivot pins 64 and 66, respectively, while free ends 68 and 70 of the shelves rest on upper and lower supports 72 and 74. When food is to be placed within container means 12 at the start of the maze—at the top of continuous pathway 40, either or both of shelves 60 and 62 may be pivoted upwards to allow placement of the food in channels 76, 78 or 80. In the embodiment shown, fixed self 58 may not be pivoted upward. In an alternative embodiment, shelves 58, 60 and 62 may be replaced partially or entirely with additional movable stops 46 and 48 to expand the maze structure.

FIG. 4 illustrates how the inventive device is assembled. As may be seen, the device is structured so as to be assembled and disassembled quickly and easily. Rear panel 18 of the container means slides into place by means of vertical grooves 82 and 84 on side connecting strips 22 and 24. Similarly, top 26 slides into horizontal grooves 86 and 88 located at the upper ends 90 and 92 of the side strips 22 and 24. Handle 87 facilitates movement of top 26. Because rear panel 18 is actually somewhat shorter than front panel 20 (see FIG. 3), top 26 may be removed without first removing rear panel 18. Thus, food may be placed within channels 76, 78 or 80 without substantial disassembly of the device.

Front panel 20 is fastened in place, as noted above, by fasteners 16, which may be in the nature of bolts, hooks, brackets, and the like. Preferred fasteners include J-bolts and cable ties. Fasteners 16 fit through openings 94 at each of the four corners of front panel 20 and attach the device to a fixture such as cage wall 14. Openings 98 of front panel 20 are positioned so as to be aligned with elongated apertures 96 within side panels 22 and 24, thus allowing a through path for secondary fasteners 100.

After placement of food morsel 34 within container means 12, a trainer outside the primate cage may maneuver the food through the continuous pathway 40 in order to teach primate 36 the location of that pathway. After the primate learns the correct path through a particular maze, i.e. successfully retrieves the food morsel from exit port 54, the trainer may remove rear panel 18 as described above, and create a different and, if desired, more difficult maze structure by rearranging movable stops 46 and 48. At least two dozen different maze configurations may be obtained with the instant device.

While the invention has been described in conjunction with the preferred specific embodiments thereof, it will be understood that this description is intended to illustrate and not limit the scope of the invention, which is defined by the appended claims.

I claim:

1. A device for enriching the environment of a contained primate, comprising a container means having a variable maze through which a primate can move an object, said maze being programmable to varying degrees of difficulty and said container means provided with a rear panel, an opposing front panel, and an interior therebetween, said front and rear panels having a plurality of substantially oppositely disposed access ports through which access to said interior of said container means may be had through each of said front and rear panels, wherein said device includes a means for instructing the primate as to the location of the correct path through the maze, said instructing means comprising a means for manipulating said object within said device through said rear panel, primate access to said object being through said front panel.

2. The device of claim 1, wherein said container means is attachable to a fixture within the primate environment.

3. The device of claim 2, wherein said variable maze comprises a plurality of movable connecting stops adapted to fit between said front and rear panels adjacent said access ports, whereby a continuous and variable pathway is provided within said container means.

4. The device of claim 3, wherein said object is larger than said access ports, so that removal of said object from said container means through said access ports is prevented.

5. The device of claim 4, wherein said front panel of said container means is provided with an exit port larger than said object, thereby allowing removal of said object from said container means through said exit port.

6. The device of claim 1, wherein said object is a morsel of food.

7. The device of claim 1, wherein said object is a token used by a primate to achieve an additional reward.

8. The device of claim 1, wherein said container means is structured so as to be quickly and easily assembled and disassembled, facilitating replacement of said object within said container means and modification of said continuous pathway.

9. The device of claim 1, wherein said access ports within said front panel are structured so that a primate within said cage may manipulate said object within said container means through said continuous pathway and remove said object through said exit port of said container means.

* * * * *